Oct. 25, 1927.  
E. HAMILTON  
1,646,692
SPLIT PULLEY AND THE LIKE
Filed Nov. 3, 1925
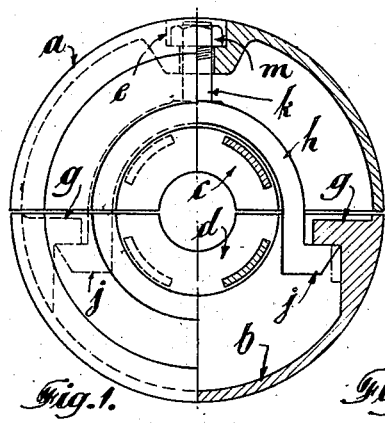
Fig. 1.
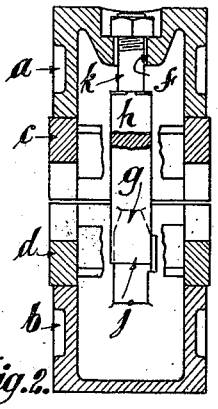
Fig. 2.
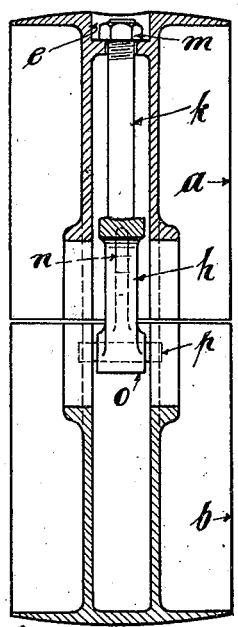
Fig. 9.
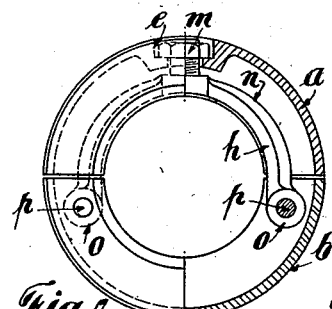
Fig. 4.
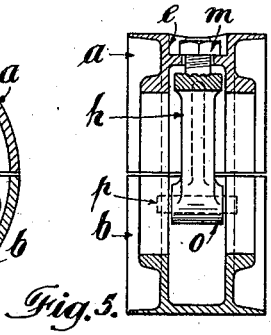
Fig. 5.
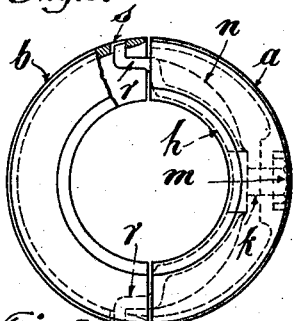
Fig. 7.
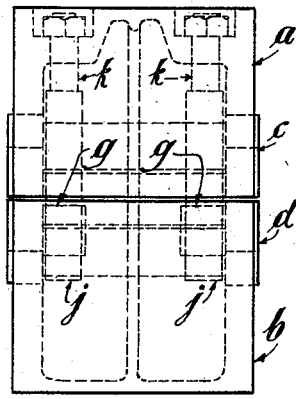
Fig. 3.
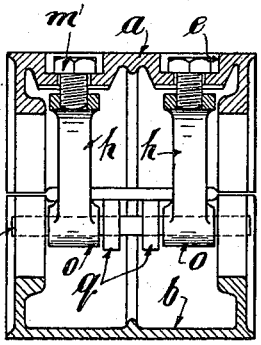
Fig. 6.
Fig. 8.
Inventor:
Ernest Hamilton.
By his Attorney: Walter Gunn Patented Oct. 25, 1927.

1,646,692

UNITED STATES PATENT OFFICE.

ERNEST HAMILTON, OF MANCHESTER, ENGLAND.

SPLIT PULLEY AND THE LIKE.

Application filed November 3, 1925, Serial No. 66,657, and in Great Britain November 6, 1924.

This invention refers to split pulleys and the like, and in particular split pulleys of small diameter.

Heretofore, these have been made of metal or wood, and the means for securing the parts together and to the shaft to which the pulley is applied, have generally consisted of screws applied and adjusted from the exterior of the pulley, the pulley being of solid cross section, and therefore, heavy if made of metal. When made of wood, which is usually the case in very small pulleys, the pulley is unsatisfactory in use.

One of the objects of this invention is to connect the parts of the pulley by means which allow of the smallest size of split pulley being made of metal at low cost, and comparatively light in weight. A further object is to connect the parts of the pulley together by means enclosed within the pulley.

According to the invention, the pulley is made hollow and encloses one or more separate U-shaped yoke or like members capable of drawing the half parts of the pulley together and thereby holding same to the shaft (or pulley bush). The arms of the U-shaped member separately and directly engage or are connected to one half part of the pulley or the like, whilst the centre or bridge portion is adjustably connected to the other half part, the adjusting means being accessible through the periphery of such part.

On the accompanying drawings:

Fig. 1 is a part sectional end elevation of one form of split pulley made in accordance with the invention.

Fig. 2 is a sectional elevation of Fig. 1 along the axis.

Fig. 3 is an elevation showing the use of two U-shaped yoke members.

Fig. 4 is a part sectional end elevation of a modified construction.

Fig. 5 is a sectional elevation of Fig. 4 along the axis.

Fig. 6 is a sectional elevation of a pulley employing two U-shaped yoke members, of the form shown in Fig. 4.

Fig. 7 is an end elevation of another modified construction.

Fig. 8 is a part side elevation of a further modification.

Fig. 9 is a sectional side elevation of a large diameter pulley, showing the application thereto of the constructional arrangement embodied in Fig. 4.

In the form shown in Figs. 1, 2 and 3, the pulley is made in two half parts $a$ and $b$ which are provided with half bushes $c$ and $d$ respectively. The part $a$ is formed at its circumference with a recess $e$ in which is provided a bolt hole $f$ and the part $b$ is formed with lugs $g$ at each side. A U-shaped yoke member $h$ is formed with outwardly projecting lugs $j$ adapted to engage with the lugs $g$ and at the bridge of the member, a screwed stud $k$ is provided to pass through the hole $f$ and receive a nut $m$. In Fig. 3 two yoke members $h$ are shown.

In use the part $b$ is fitted against the shaft, the yoke member is then fitted into the part $b$ so that the lugs $j$ engage the lugs $g$. The bush $c$ (where provided) is then put into place through the arch of the yoke member, and the part $a$ is fitted thereon.

The clamping nut $m$ is then put on to the stud $k$ of the yoke member and when tightened thereon, draws the parts $a$ and $b$ together to grip the shaft.

In the modification shown in Figs. 4, 5 and 6, the yoke member $h$ is lightened and provided with strengthening webs $n$, the lugs $j$ being replaced by drilled lugs $o$. The lugs $g$ in part $b$ are omitted, the yoke member being secured thereto by pegs $p$ passed through the sides of the pulley and through the drilled lugs $o$. In this example, no pulley bushes are used the pulley fitting directly on to the shaft, and in the longer pulley shown in Fig. 6, two yoke members are shown and intermediate supporting lugs $q$ are provided on the part $b$ to receive the common pegs $p$, which pass through yoke members. In the form shown in Fig. 6, bolts $m^1$ are used, in place of nuts, to secure the parts together.

In the modification shown in Fig. 7, the yoke member $h$ is formed with lugs $r$ adapted to engage with holes $s$ provided in the circumference of the part $b$. The legs of the yoke member are sufficiently long to allow lateral movement of the member to enable it to be fitted or removed, whilst in use it is located against such lateral displacement by the part $a$.

In the modification shown in Fig. 8, the stirrup $h$ is similar to that shown in Figs. 4, 5 and 6, the pulley being provided with inwardly projecting pegs or studs $t$ on which the drilled lugs $o$ fit.

Fig. 9 shows a construction similar in form to that shown in Figs. 4 and 5, but as applied to a large diameter pulley. The pulley may be of cast iron, or of a metal capable of being pressed to produce the hollow half parts, but the yoke member will preferably be made of steel.

In the forms shown in Figs. 1, 3 and 7, the lugs on the ends of the yoke member and on the inner face of the pulley segment may be slightly under-cut to help to anchor the parts together and prevent the limbs of the yoke member closing in.

The improved pulley may be used with or without a bush. As shown in Fig. 9, the invention may also be usefully applied to large split pulleys and in such connection will be applied to the hub of the pulley, which may extend as a web or disc to the pulley rim and take the place of the usual spokes (or be additional thereto), the stirrup member, lying within the said hub, the walls of which may be comparatively thin. With the fastening means thus concealed or enclosed, the pulley can be used with greater safety.

What I claim is:—

1. A split pulley comprising two half parts collectively forming the pulley proper, at least one U-shaped yoke member within the pulley, the ends of the arms of the U-shaped yoke member directly engaging one of said half-parts of the pulley, means carried by the centre or bridge portion of the U-shaped member to adjustably engage the other half part of the pulley, said means being accessible through the periphery of the pulley, either to draw the two half parts of the pulley together and thereby clamp the pulley to the shaft, or to remove the pulley from its shaft, as set forth.

2. A split pulley comprising two half parts collectively forming the pulley proper, projections on one of said half parts, at least one U-shaped yoke member, the ends of the arms of the U-shaped yoke member, engaging said projections, a screwed stud or projection on the bridge portion of the U-shaped member passing through the periphery of the other half part of the pulley, and a nut on said screwed stud adapted to draw the two half parts of the pulley together, as set forth.

In testimony whereof I have signed my name to this specification.

ERNEST HAMILTON.